Dec. 24, 1929.  F. H. PARKER ET AL  1,740,710
FLUID MOTOR
Filed Nov. 5, 1927
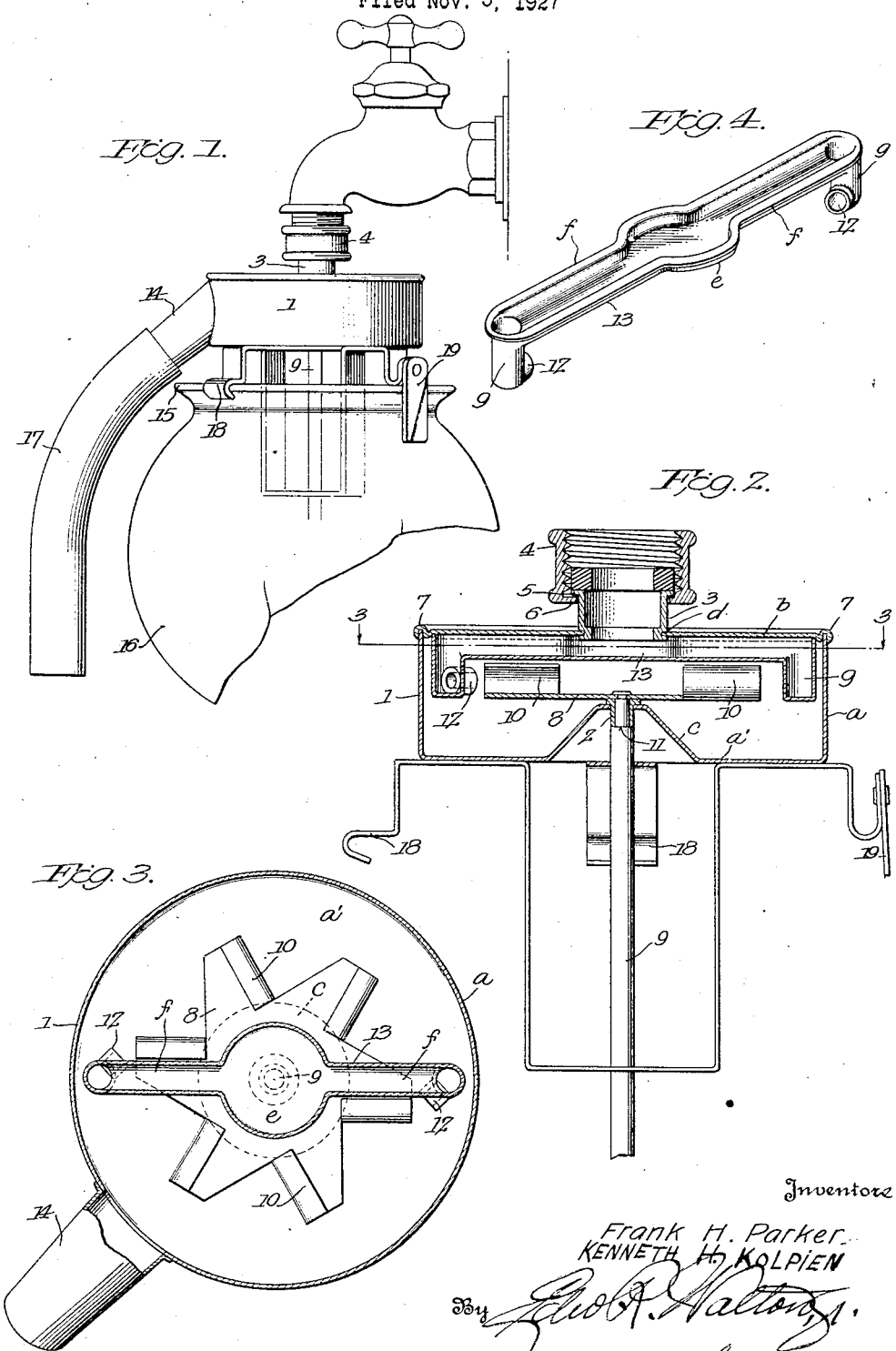
Inventors
Frank H. Parker
Kenneth H. Kolpien
By
Attorney Patented Dec. 24, 1929

1,740,710

UNITED STATES PATENT OFFICE

FRANK H. PARKER AND KENNETH H. KOLPIEN, OF CLEVELAND, OHIO, ASSIGNORS, BY MESNE ASSIGNMENTS, TO THE NIAGARA MIXER COMPANY, OF CLEVELAND, OHIO, A CORPORATION OF OHIO

FLUID MOTOR

Application filed November 5, 1927. Serial No. 231,281.

The present invention is a fluid motor particularly adapted for agitators or mixers and of the type which can be readily attached or supported from a water tap or faucet of domestic plumbing systems whereby the agitator will be operated.

It is known that similar devices have been produced which are operated by a force of water from the ordinary household faucet, but owing to the construction of such devices, there is an uneven pull or pressure on the device resulting in the mixer shaking or wobbling during the operation, and in the bearings of the operating parts wearing off centers, resulting in the impelling water leaking into the mixer and in a general unsatisfactory condition. The construction of the present invention aims to overcome these drawbacks.

The object of the invention includes supporting the mixer or agitating means from the center of its longitudinal axis and to supply the jets or streams of water to the motor in such manner that the device will be evenly balanced in its suspended position.

This invention resides in the new and improved features of construction, combination and arrangement of parts resulting in simplicity, durability and utility, which render the invention more practical and efficient, easy to manufacture and assemble, and relatively economical to manufacture.

In this specification and the annexed drawings, the invention is disclosed in the form in which it is considered to be the best, but the invention is not limited to such form because it is capable of being embodied in other forms; and it is to be understood that in and by the claims following the description herein it is intended to cover the invention in whatever form it may embody within the scope thereof.

Referring particularly to the drawings which show the preferred embodiment of the invention as at present devised:

Figure 1 is a side elevation of the improved mixer, applied or suspended from the usual household faucet, Fig. 2 is a vertical sectional view taken from the motor with the mixing bowl removed therefrom, Fig. 3 is a horizontal transverse sectional view of the motor casing taken substantially on line 3—3 of Fig. 2 and looking in the direction of the arrows, and Fig. 4 is a perspective view of the fluid channel and nozzles to convey and direct the water from the suspension coupling connection to the water wheel.

Throughout the specification and drawings, like characters refer to similar and like parts.

Referring in detail to the drawings, 1 generally denotes a motor chamber or water casing which is constructed of sheet material and consisting of a bottom section $a$ and a top section $b$. The bottom section $a$ is made preferably of a single piece of sheet material, suitably drawn or stamped to provide a bottom wall $a'$ having an upstanding annular flange forming the side wall of the casing 1. The radial center of the bottom wall $a$ is depressed inwardly to form the substantial conical shaped inward projection $c$, the apex of which is apertured to receive a bushing 2. This bushing 2 is disposed at the axial center of the casing. The top $b$ of the casing is formed of a flat disc or plate having a central opening in which an intake tube or nipple 3 is inserted. The longitudinal axis of the tube 3 is in alignment with the axis of the bushing 2, and the tube 3 is formed on its inner end with a reduced portion providing a shoulder $d$, which rests on the outer side edge of the central opening in the top $b$, and has its reduced portion extending through the opening into the interior of the casing 1, where the edges of the reduced end are crimped or rolled over the other side edges of the opening, thereby maintaining the tube 3 securely and in position.

A sleeve coupling connection member 4, of greater diameter than the tube 3, surrounds the latter and has an inwardly extending flange 6 to cooperate and abut an outwardly extending flange 5 on the outer end of said tube, whereby the coupling member 4 has a swivel connection on the tube 3 and is maintained in position thereon. The coupling member is internally threaded to receive a threaded end of the faucet or the like.

Within the motor casing 1 is journaled a turbine wheel 8 arranged horizontally in the casing and mounted fast on the shaft 9 suitably journaled in the bushing 2. The turbine wheel 8 consists of a relatively flat piece of sheet metal, slit at its periphery and having portions between the slits curved upwardly to form vanes 10. The shaft 9 is maintained in position by having the end thereof journaled in the bushing 2 reduced to form the shoulder 11 and having its other end extended through the center axis of the turbine wheel to which it is riveted or otherwise suitably secured.

The turbine wheel is driven by jets of water or other fluid pressure, discharged from nozzles 12, which in the present instance are two in number, but there may be any desired number of nozzles provided the same are equi-spaced around the periphery of the turbine wheel so that they will direct their discharge against the vanes at diametrically opposite points to produce an even balance and equal pressure on the shaft 9.

The nozzles 12 are mounted in the ends of the channel plate 13 which is produced by stamping and drawing operations. This channel plate consists of a single piece of sheet metal having an enlarged circular central portion e and two oppositely extending radial arms f. Since, in the present disclosure, only two nozzles 12 are shown, only two arms f have been provided, but there may be as many arms f as there are nozzles, radiating from the circular central portion e. The central portion e and the arms f are stamped to form therein interconnecting and depressed channels, and the ends of the arms are formed, by drawing operations, with depending tubular portions g, in the sides of which the nozzles 12 are provided. The nozzles 12, may be dispensed with by merely providing an opening in the sides of the tubular portions g, but at this time it has been found that better results are obtained by the provision of the nozzles 12. The channel plate 13, thus constructed, is secured by any suitable means such as spot welding, soldering or the like, to the inner face of the top plate b, the enlarged central portion e thereof being arranged directly under the inlet pipe 3. The length of the tubular portions g, of said channel plate, are such as to position the nozzles 12 in the same plane with the vanes 10 of the turbine wheel, as fully illustrated in Figure 2.

The top wall b of the motor casing has its outer edge secured to the edge of the side wall of the bottom member a by suitably seaming the edges together, as shown at 7, in a manner which is well known.

After the jets of water have been expended on the vanes of the turbine 8, the water is discharged from the motor casing through a spout 14, projecting from and communicating with the interior of the motor casing as clearly shown in Figures 1 and 3. This spout is of relatively short length, but sufficient to discharge water beyond the edge 15 of the mixing bowl 16 supported below the motor casing 1. The flexible tube 17 is detachably connected to the outer end of the spout 14 in order to convey the fluid discharge to any desired place.

It will be observed that the inwardly depressed projection c (see Fig. 2) has a two-fold purpose: First, to provide a water space for the dead water between the turbine wheel 8 and the bottom of the motor casing; and, secondly, in providing a bearing for the shaft 9 at a point adjacent its connection with the water wheel and normally above the dead water line or level in the motor casing at the bushing 2. However, in practice it is found that no leakage occurs at the bushing 2 in the present construction. The shaft 9 extends downwardly for a considerable distance below the motor casing and into the mixing bowl 16, and is adapted to have an agitator or dasher blade secured thereto. The mixing chamber or bowl 16 is secured directly from the bottom of the motor casing, and in the present disclosure, suitable clips 18 and 19 are illustrated for detachably securing it in position.

From the above it will be seen that a practical and efficient fluid motor for agitators and mixers has been provided which is adapted to be suspended directly from the usual household faucet or other suitable connection, said point of attachment being at the axial center of the motor casing, and the turbine wheel and shaft 9 having their axes in alignment therewith to prevent vibration or wobbling during the operation, and further that the impinging propelling jets are equally distributed on opposite sides of the water wheel to produce even balance on the wheel and in the rotation of the shaft 9.

Having thus described the invention, what is claimed as new and upon which Letters Patent are desired, is:

1. A motor for agitators comprising a motor casing having an inlet opening and a bottom wall, a nipple connected with the casing at said opening, an agitator shaft extending into the casing through and supported by said bottom wall, a turbine wheel in said casing and fast upon said shaft, nozzles communicating with the nipple and arranged in the casing on opposite sides of the shaft to deliver impelling jets of fluid at equi-distances around the wheel, and an attaching member mounted on the top of the casing at the center thereof, whereby the device may be suspended therefrom, said nipple being connected with said attaching member.

2. A motor of the kind described comprising a motor casing having a discharge opening opposed walls and, a shaft extending from said casing through a wall thereof, a rotor in said casing and mounted on said shaft to actuate the latter, an attaching coupling member mounted on the opposite wall of said casing in substantial alignment with the axis of said shaft, conduits within the casing having one of their ends arranged to discharge jets of water against said rotor and the other of their ends connected to said coupling member to receive the fluid supply therethrough.

3. A motor for agitators or mixers comprising a motor casing to be detachably connected to a mixing chamber and having opposed walls, an agitator shaft journaled in the bottom wall of said casing and extending into the latter, a water wheel in said casing and secured to said shaft, the opposite wall of the casing having a central fluid inlet opening, nozzles connected with said opening and arranged to discharge impelling jets of fluid on said wheel at substantially equal distances around the periphery of the latter, and a coupling on said opposite wall of the casing and communicating with said inlet opening for detachably securing the device to a faucet or the like, said motor casing having a water discharge outlet.

4. A motor for agitators and mixers comprising a motor casing, a fluid rotor in the casing, a fluid intake nipple secured to a wall of the casing and communicating therewith, a channel plate underlying said intake nipple and having the edges of its channeled face abutting the inner face of said casing, said plate being suitably secured to said inner wall, said channel plate having outlet nozzles arranged to direct jets of fluid tangentially of said rotor.

5. A motor for agitators and mixers comprising a motor casing, a fluid rotor in the casing mounted to rotate in a substantially horizontal plane, a fluid intake nipple secured to the top wall of the casing and communicating therewith, a channel plate underlying said intake nipple and having the edges of its channeled face abutting the inner face of said top wall, the said plate being suitably secured to said wall, said channel plate having outlet nozzles arranged to direct jets of fluid tangentially of said rotor, an agitator shaft extending from said rotor through the bottom wall of said casing, and a fluid outlet discharge nozzle for said casing.

6. A motor for agitators and mixers comprising a motor casing, a fluid rotor in the casing, said casing having a fluid inlet opening therein, an integral channel plate in the casing of said opening and having the edges of its channel face abutting and secured to the inner face of said wall, the end portions of said plate being formed with laterally projecting tubes having openings therein to discharge jets of fluid against said rotor, a fluid discharge nozzle on the casing, and an agitator shaft extending from said casing and having operative connection with the rotor.

7. A motor for agitators and mixers comprising a motor casing, a fluid rotor in the casing mounted to rotate in a substantially horizontal plane, a fluid intake nipple secured to the top wall of the casing and communicating therewith, an integral channel plate underlying said intake nipple and having the edges of its channel face abutting and secured to the inner face of said wall, the end portions of said plate being formed with integral depending tubes having openings therein to discharge jets of fluid against said rotor, a fluid discharge nozzle on the casing, and an agitator shaft extending from said casing and having operative connection with the rotor.

8. A motor for agitators and mixers comprising a motor casing, a rotor mounted in said casing to rotate in a substantially horizontal plane, the top wall of the casing having an opening therein, an upwardly projecting nipple having one end secured to said top wall at said opening, a coupling attaching member swiveled on said nipple, fluid passages arranged below the inner end of said nipple for conveying the fluid therefrom to said rotor, said passages terminating in nozzles for directing propelling jets against said rotor, said rotor being spaced from the bottom of said casing providing a waste or dead water chamber, means whereby the waste water is discharged from said chamber, and an agitator shaft extending from the casing and having operative connection with said rotor, said rotor and shaft being in axial alinement with said opening in the top wall of the casing.

9. A motor for agitators and mixers comprising a motor casing, a fluid rotor in the casing mounted to rotate in a substantially horizontal plane, the top wall of the casing having an opening therein, an intake nipple having one end crimped around the edges of said opening, whereby the nipple is securely held against movement therein, a coupling attaching and separating means swiveled on the outer end of said nipple, a channeled plate disposed below said nipple and extending diametrically thereto and having its channeled face opposing the inner face of said top wall and secured thereto to prevent leakage between the plate and the wall, said plate including the arms radiating from the center of said plate, and terminating in discharge nozzles positioned to direct impelling jets of fluid against said rotor.

10. A motor for agitators and mixers comprising a motor casing having an intake opening in one wall thereof, a fluid rotor in the casing mounted to rotate therein, a member within the casing extending substantially parallel with said wall and opposed to said opening to form a fluid passage from said intake, and having outlet nozzles arranged to direct jets of fluid against said rotor, an agitator shaft extending from said rotor through an opposite wall of the casing, said casing having a discharge outlet.

11. A motor for agitators and mixers comprising a motor casing having a fluid inlet opening in the top wall thereof, a plate member underlying the top wall and said inlet opening, and arranged to form a channel for the fluid entering said opening, a fluid rotor within the casing below said plate member, means connected with said channel for discharging fluid jets against said rotor, an agitator shaft connected with said rotor and extending from said casing, said casing having a fluid discharge outlet.

In testimony whereof we have hereunto set our hands.

FRANK H. PARKER.
KENNETH H. KOLPIEN.

CERTIFICATE OF CORRECTION.

Patent No. 1,740,710.  Granted December 24, 1929, to

FRANK H. PARKER ET AL.

It is hereby certified that error appears in the printed specification of the above numbered patent requiring correction as follows: Page 3, line 3, claim 2, strike out the words "opposed walls and" and insert the same to follow after the word "having" in line 2, same claim; and that the said Letters Patent should be read with this correction therein that the same may conform to the record of the case in the Patent Office.

Signed and sealed this 18th day of February, A. D. 1930.

M. J. Moore,
Acting Commissioner of Patents.

(Seal)